US006961514B1

(12) United States Patent
Neuman et al.

(10) Patent No.: US 6,961,514 B1
(45) Date of Patent: Nov. 1, 2005

(54) SYSTEM AND METHOD FOR COMMUNICATING IMAGES TO A REMOVABLE MEDIA DEVICE

(75) Inventors: Darren Neuman, San Jose, CA (US); Brett Grandbois, Fremont, CA (US)

(73) Assignee: LSI Logic Corporation, Milpitas, CA (US)

( * ) Notice: Subject to any disclaimer, the term of this patent is extended or adjusted under 35 U.S.C. 154(b) by 0 days.

(21) Appl. No.: 09/472,630

(22) Filed: Dec. 27, 1999

(51) Int. Cl.$^7$ ............................................. H04N 5/225
(52) U.S. Cl. ..................... 386/117; 386/46; 348/207.99
(58) Field of Search ............................... 386/1, 46, 117, 386/121, 124–126; 348/211.3, 211.2, 211.4, 348/211.5, 211.6, 211.99, 158, 231.99, 231.7, 348/14.08, 14, 211; 358/1.15, 426; 370/0; 709/203–207

(56) References Cited

U.S. PATENT DOCUMENTS

| | | | | | |
|---|---|---|---|---|---|
| 4,097,893 | A | * | 6/1978 | Camras | 348/158 |
| 4,531,164 | A | * | 7/1985 | Maeda et al. | 386/117 |
| 5,793,419 | A | * | 8/1998 | Fraley | 348/143 |
| 6,396,537 | B1 | * | 5/2002 | Squilla et al. | 348/239 |
| 6,496,222 | B1 | * | 12/2002 | Roberts et al. | 348/231.99 |
| 6,522,352 | B1 | * | 2/2003 | Strandwitz et al. | 348/211.3 |
| 6,535,243 | B1 | * | 3/2003 | Tullis | 348/211.2 |
| 6,715,003 | B1 | * | 3/2004 | Safai | 348/211.3 |

* cited by examiner

Primary Examiner—James J. Groody
Assistant Examiner—Christopher Onuaku
(74) Attorney, Agent, or Firm—Suiter•West•Swantz PC LLO

(57) ABSTRACT

A system and method for communicating an image to a removable media device includes communicating the image from an image capture device to the removable media device over a wireless connection. The communicated image is stored in memory on the removable media device, and the stored image is deciphered. The deciphered image is recorded on removable media, the recorded image capable of being accessed on removable media device. In an additional aspect of the present invention, a method for communicating and formatting an image from an image capture device includes initiating a connection between an image capture device and an image storage device and querying the image storage device for a supported format. If the supported format differs from an image format, the image is deciphered to the supported format and communicated from the image capture device to the image storage device.

8 Claims, 6 Drawing Sheets

SYSTEM AND METHOD FOR COMMUNICATING IMAGES TO A REMOVABLE MEDIA DEVICE

FIELD OF THE INVENTION

The present invention generally relates to the field of image preservation, and particularly to a system and method for communicating and storing images.

BACKGROUND OF THE INVENTION

The field of storing and preserving images has made great advances. From previous photographic methods that required the developing of pictures and film using chemical methods to current electronic methods wherein an image may be stored electronically, users have access to a wide range of options. However, current electronic methods are still inconvenient to a user. For example, a user of a digital camera may wish to view the image on another device, such as a video display device with a larger viewing area. To accomplish this, the user must connect cables from the digital camera to an image-viewing device to transfer the image. Connecting cables may be awkward, both to store and locate the cables, and then to properly connect the cables between the devices. Further, the image as utilized by a digital camera may be stored in a format that in incompatible with the image-viewing device, making the viewing of the image difficult if not impossible.

One method used to avoid the inconvenience of connecting cables involved storing the image on a medium that may be accessed by a user on another system. For example, in the past, if a user wished to have images stored on a video disk, the user typically requested that the photographs be mastered on the disk by a photo processing lab. This process is inconvenient to the user. For instance, mastering the images on a videodisk may require an image processing service to format the disk with the images, which requires a significant amount of time and is generally expensive. Additionally, the user is typically not able to specify which images to add, change, and the like. Further, the images may be converted to a format that is not supported by the system the user wishes to use to view the images.

Therefore, it would be advantageous to provide a system and method for the communication and storage of images.

SUMMARY OF THE INVENTION

Accordingly, the present invention is directed to a system and method for communicating and storing images. In a first aspect of the present invention, a method for communicating and storing an image on a removable media device includes communicating the image from an image capture device to the removable media device over a wireless connection. The communicated image is stored in memory on the removable media device, and the stored image is deciphered. The deciphered image is recorded on removable media, the recorded image capable of being accessed on removable media devices.

In a second aspect of the present invention, a system for communicating and storing an image on a removable media device includes a wireless communication device for communicating the image from an image capture device to the removable media device utilizing a wireless connection. The system also includes a memory device for storing the communicated image in memory on the removable media device and a decoder/encoder device for deciphering the stored image. Further, the system includes a recording device for recording the deciphered image on removable media wherein the recorded image on the removable media is capable of being played back on removable media devices.

In a third aspect of the present invention, a method for communicating and formatting an image from an image capture device includes initiating a connection between an image capture device and an image storage device and querying the image capture device for a supported format. If the supported format differs from an image format, the image is deciphered to the supported format and communicated from the image capture device to the image storage device.

It is to be understood that both the forgoing general description and the following detailed description are exemplary and explanatory only and are not restrictive of the invention as claimed. The accompanying drawings, which are incorporated in and constitute a part of the specification, illustrate an embodiment of the invention and together with the general description, serve to explain the principles of the invention.

BRIEF DESCRIPTION OF THE DRAWINGS

The numerous advantages of the present invention may be better understood by those skilled in the art by reference to the accompanying figures in which.

DETAILED DESCRIPTION OF THE INVENTION

Reference will now be made in detail to the presently preferred embodiments of the invention, examples of which are illustrated in the accompanying drawings.

Referring generally now to FIGS. 1 through 6, exemplary embodiments of communicating and storing images are shown. An image capture device includes a digital camera, camcorder and the like utilized to capture an image. A removable media device includes a device capable of utilizing a digital versatile disk (DVD), compact disc-rewriteable (CD-RW), compact disc recordable and erasable (CD-R/E), video compact disc (VCD), and the like as contemplated by a person of ordinary skill in the art. Exemplary methods for communicating and recording images are discussed. It is understood that the specific order, or hierarchy, disclosed is exemplary in nature. Based upon design preferences, it is understood that the specific order, or hierarchy, can be rearranged while remaining within the scope of the present invention. The attached method claims present elements of the various steps in a sample order, and is not meant to be limited to the specific order or hierarchy presented.

Figure 1:
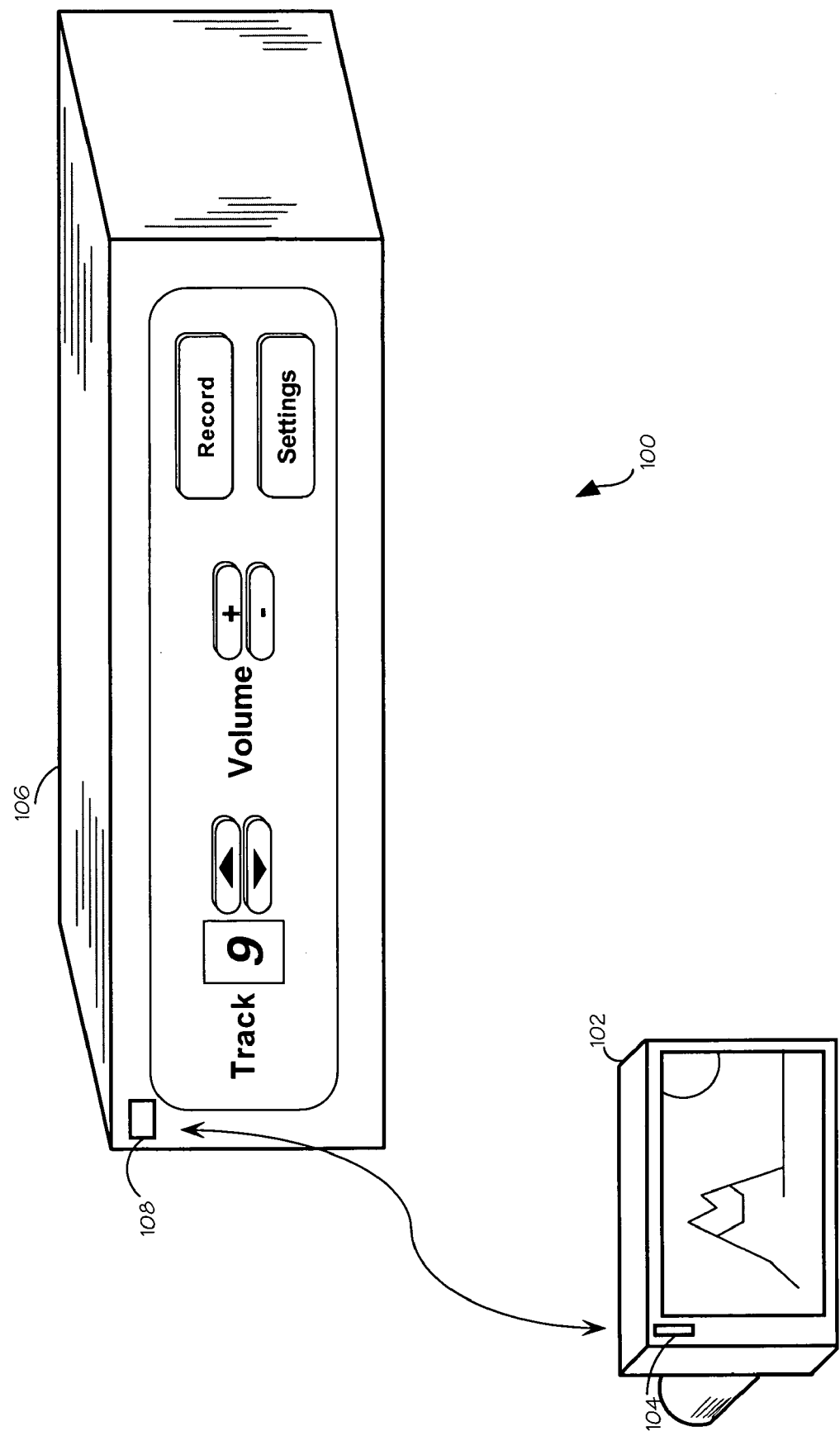
FIG. 1 is an illustration of an exemplary embodiment of the present invention wherein an image capture device configured as a digital camera is capable of transferring an image over an infrared link to a removable media device configured as a digital versatile disk (DVD) device.

Referring now to FIG. 1, an exemplary embodiment of the present invention is shown. A system 100 for transferring and recording an image includes an image capture device 102. The image capture device 102, configured as a digital camera, includes an infrared communication device 104 for establishing a wireless connection with a removable media device 106 that also includes an infrared communication device 108. The removable media device 106 is configured as a digital versatile disk (DVD) device. In this way, the image capture device 102 is capable of establishing a wireless connection with the removable media device 106 without the time-consuming process of connecting cables.

Additionally, the use of an infrared connection has certain security and connection advantages. Typically, an infrared connection device has a thirty degree range at which to point toward a second infrared connection device, although full 360 degree infrared connection devices are available. By utilizing a limited range, a user may restrict the access to the transmitted images thereby limiting the chances of unauthorized access to the images. Further, the limited range may eliminate the confusion of connecting to more than one available device by allowing the user to "aim" the image capture device at the removable media device.

Figure 2:
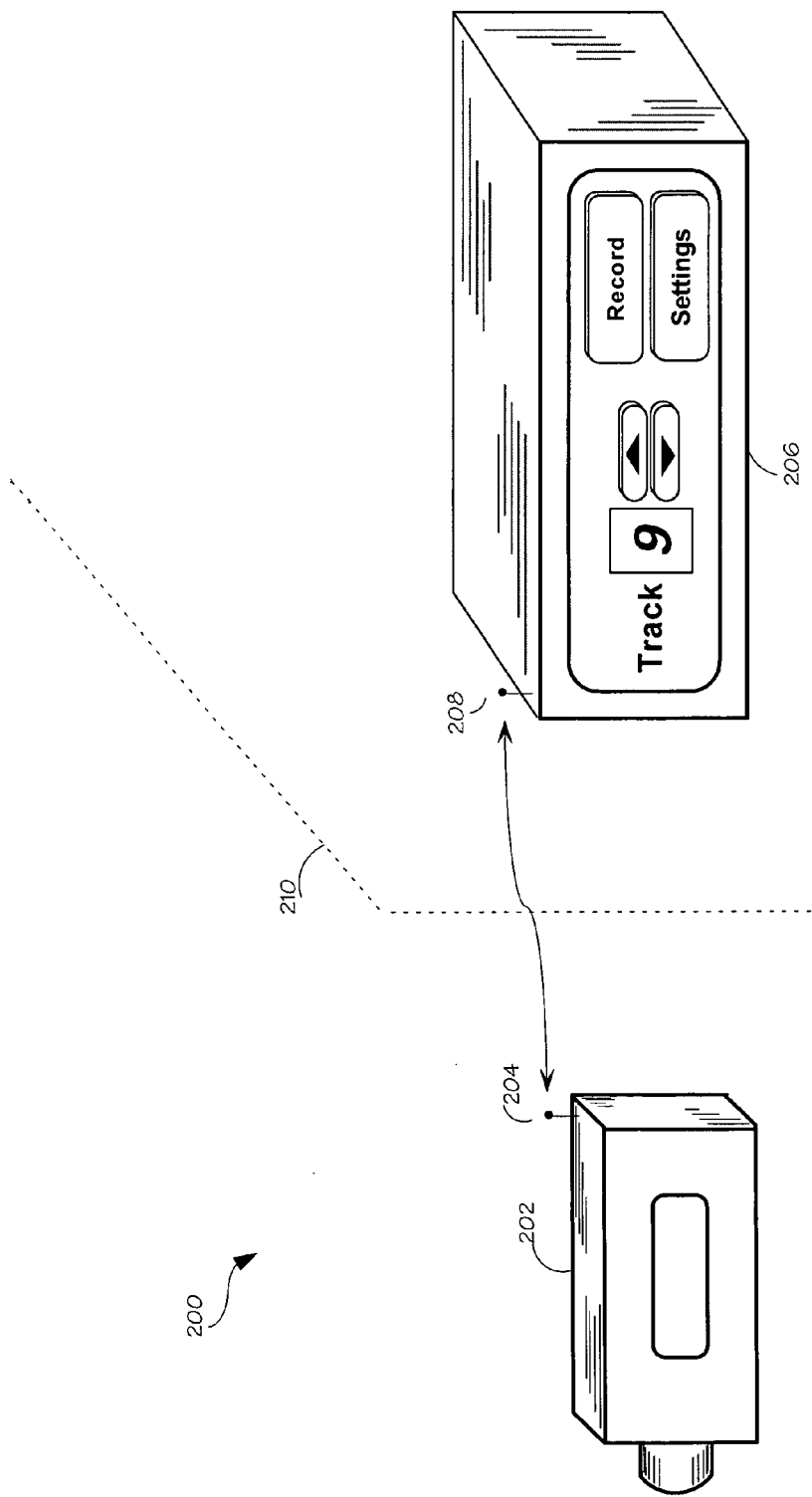
FIG. 2 is an illustration of an additional exemplary embodiment of the present invention wherein an image capture device configured as a camcorder is capable of transferring an image over a radio frequency (RF) link to a removable media device.

Referring now to FIG. 2, an additional exemplary embodiment of the present invention is shown. A system 200 for transferring and recording an image includes an image capture device 202 configured as a digital camcorder. The image capture device 202 includes a radio frequency communication device 204 for establishing a wireless connection with a removable media device 208 that also includes a radio frequency communication device 106. Thus, a connection is capable of being established without attaching cables.

Further, the wireless connection may be of sufficient strength to enable a connection to be established even in the presence of obstructions. For example, the image capture device 202 may establish a connection with the removable media device 208 even though a wall 210 is positioned between the two units. Further, the wireless connection may be of sufficient strength to bounce the signal to enable a wireless connection to be established between devices placed in different locations, such as different rooms. For example, an infrared signal may be generated of sufficient strength to bounce off objects and obstructions to extend the effective range of the connection. In this way, a user may transfer and record images to a removable media device regardless of the orientation of the image capture device. Although an infrared wireless network and radio frequency network are disclosed, it should be apparent that a wide range of wireless networks may be utilized by the present invention as contemplated by a person of ordinary skill in the art without departing from the spirit and scope thereof.

Figure 3:
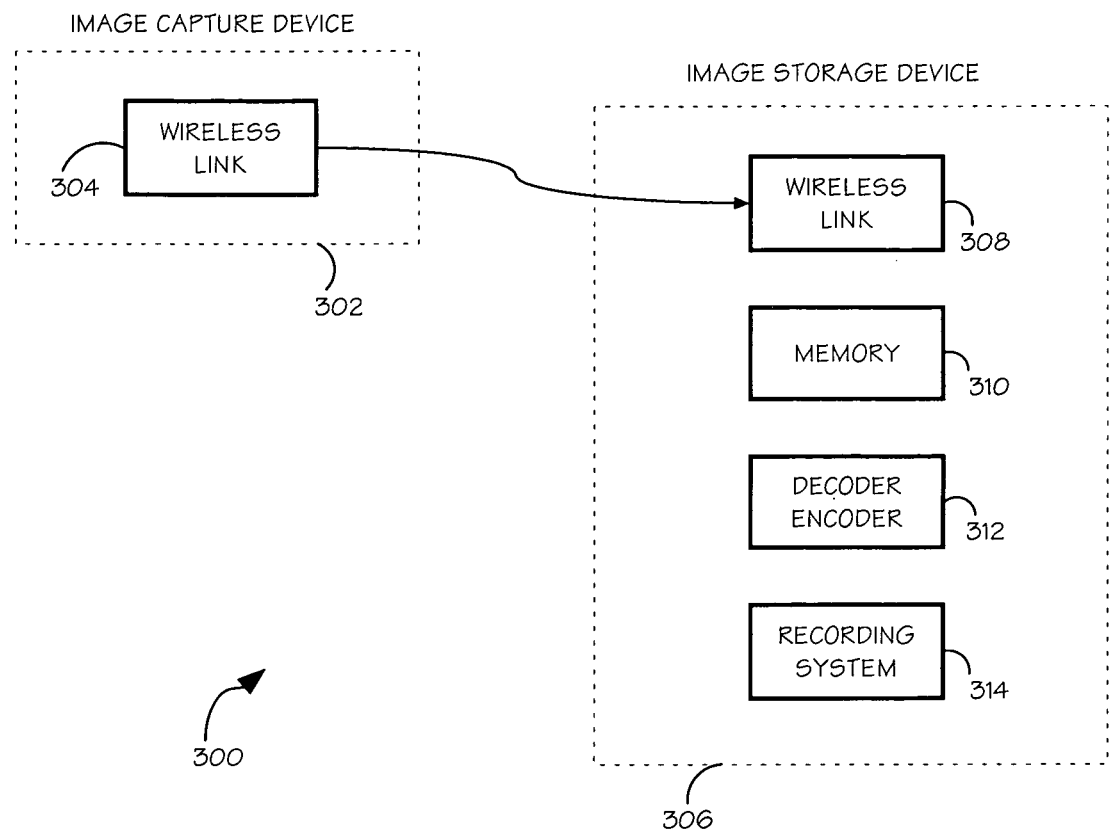
FIG. 3 is a block diagram depicting an exemplary embodiment of the present invention wherein an image communication and recordation system including an image capture device and image storage device is shown.

Referring now to FIG. 3, a block diagram is shown depicting an exemplary image communication and transfer system 300. An image capture device 302 includes a wireless linking device 304 for communicating over a wireless network, such as a radio frequency and/or infrared network. An image storage device 306, such as a removable media device, also includes a wireless link 308. In this way, the image capture device 302 is capable of communicating with the image storage device 306 without the necessity of cables, greatly improving the efficiency of image transfer and the mobility of the image capture device. The image storage device receives an image over the link and transfers the image to memory 310. The entire image or merely portions of the image as the image is communicated may be transferred to memory 310 at which, a decoder/encoder converts the image or portion of the image to the desired format. If the image is already in the desired format, the decoder/encoder is capable of transferring the image directly to the recording system 314. Once the image is in the desired format, the recording system records the image so that it may be latter accessed. The recording system may record the image on removable media so that the image may be transferred and accessed on a wide variety of systems. For example, the image may be recorded on a digital versatile disk (DVD) to be accessed on a home theater, information handling system, such as a personal computer, and the like.

Additionally, the image storage device may include the ability to communicate with other devices either directly or through a network connection device. For example, the image storage device may communicate with a website through a modem, Ethernet, digital camera through universal serial bus (USB), universal asynchronous receiver-transmitter (UART), or infrared link, computer through universal serial bus (USB), IEEE 1394, universal asynchronous receiver-transmitter (UART), Ethernet or infrared link, digital camcorder through IEE 1394, analog composite video, s-video and the like. The image storage device may communicate directly through a system bus, which may comprise any state of the art bus architecture according to promulgated standards. For example, the system bus may include industry standard architecture (ISA), extended industry standard architecture (EISA), Micro Channel Architecture (MCA), peripheral component interconnect (PCI) local bus, standards promulgated by the Institute of Electrical and Electronics Engineers (IEEE) including IEEE 488 general-purpose interface bus (GPIB), IEEE 696/S-600, and so on. Furthermore, the system bus may be compliant with any promulgated industry standard. For example, the system bus may be designed in compliance with any of the following bus architectures: parallel interface, Industry Standard Architecture (ISA), Extended Industry Standard Architecture (EISA), Micro Channel Architecture, Peripheral Component Interconnect (PCI), Universal Serial Bus (USB), Access bus, IEEE P6394, Apple Desktop Bus (ADB), Concentration Highway Interface (CHI), Fire Wire, Geo Port, or Small Computer Systems Interface (SCSI), for example.

The image storage device may also communicate with other devices and system through a network connection device. The network connection device preferably implements industry promulgated architecture standards, including Recommended Standard 232 (RS-232) promulgated by the Electrical Industries Association, Infrared Data Association (IrDA) standards, Ethernet IEEE 802 standards (e.g., IEEE 802.3 for broadband and baseband networks, IEEE 802.3z for Gigabit Ethernet, IEEE 802.4 for token passing bus networks, IEEE 802.5 for token ring networks, IEEE 802.6 for metropolitan area networks, 802.66 for wireless networks, and so on), Fibre Channel, digital subscriber line (DSL), asymmetric digital subscriber line (ASDL), frame relay, asynchronous transfer mode (ATM), integrated digital services network (ISDN), personal communications services (PCS), transmission control protocol/Internet protocol (TCP/IP), serial line Internet protocol/point to point protocol (SLIP/PPP), Universal Serial Bus (USB), and so on. For example, the network connection device may comprise a network adapter, a serial port, parallel port, printer adapter, modem, universal asynchronous receiver-transmitter (UART) port, and the like, or use various wireless technologies or links such as an infrared port, radio-frequency (RF) communications adapter, infrared transducers, or RF modem.

Figure 4:
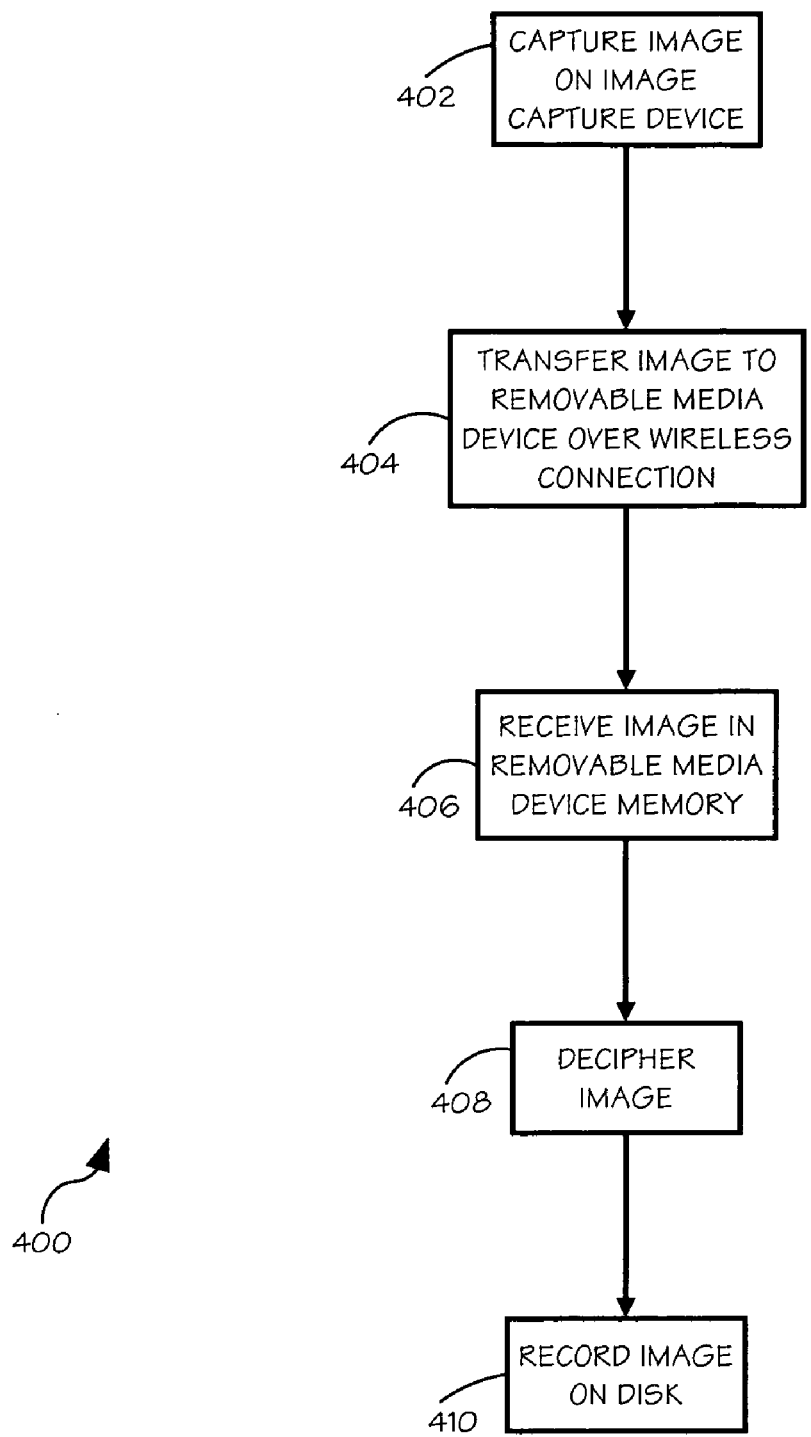
FIG. 4 is a flow diagram depicting an exemplary method of the present invention wherein an image is transferred over a wireless connection to be deciphered and recorded for later access.

Referring now to FIG. 4, an exemplary method 400 for communicating and recording an image is shown. A user of an image capture device captures an image 402. The captured image is then transferred over a wireless connection 404. The transferred image is received in memory on the removable media device 406. The image is then deciphered 408. Deciphering the image may include decoding the stored image from a first format to a photoframe, and encoding the photoframe to a second format. Thus, the image may be deciphered to any desired format. For example, a user may wish to store an image from an image capture device to a digital versatile disk (DVD). A user may transfer the image from the image capture device in a first format, such as Graphic interchange Format (GIF), bitmap, and Joint Photographic Experts Group (JPEG) to a second format, such as a Motion Pictures Experts Group (MPEG) bitstream, capable of being utilized by the digital versatile disk (DVD) device, tagged image file format (TIFF) files, Kodak flashpix, and the like. The image may then be recorded on a removable medium 410. In this way, the image capture device is capable of receiving communicated images from a wide range of image capture devices and store these images on removable media so that the images may be shared on a variety of devices. Although exemplary file formats are discussed, it should be apparent that a variety of formats may be utilized by the present invention and not depart from the spirit and scope thereof.

Figure 5:
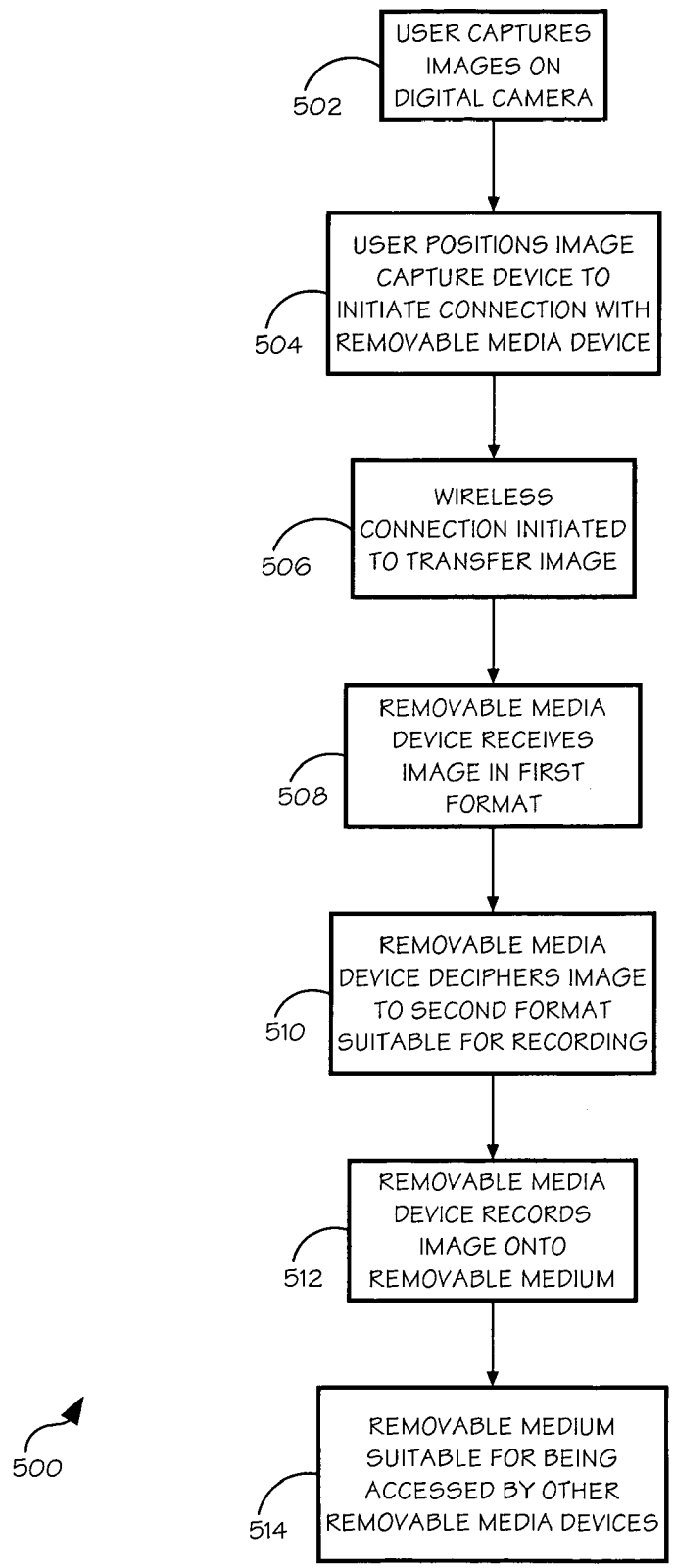
FIG. 5 is a flow diagram depicting an additional exemplary method of the present invention wherein an image captured on a digital camera is transferred over a wireless connection, deciphered from a first format to a second format, and recorded onto a removable medium.

Referring now to FIG. 5, an additional exemplary method 500 for communicating and recording an image is shown. A user employs a digital camera to take a picture 502. After taking the picture, the user may wish to store the picture, which may include text, music, voice clips, and the like, on a medium for storage and later viewing. Therefore, the user positions the digital camera to access a removable media device 504. This may involve aiming an infrared connection device on the camera toward an infrared connection device included on the removable media device. The wireless connection is then initiated and the transfer of the image begun 506. The removable media device begins receiving the image 508 and deciphering the image, as it is received 510. The deciphered image is then recorded onto a removable medium 512. The removable medium is suitable for being accessed by other removable media devices 514. In this way, the user may share the images with others as desired by giving the medium containing the images to the users. For example, the recorded image may be saved as a photo album or slide show to enable users to view and interact with a plurality of images.

Figure 6:
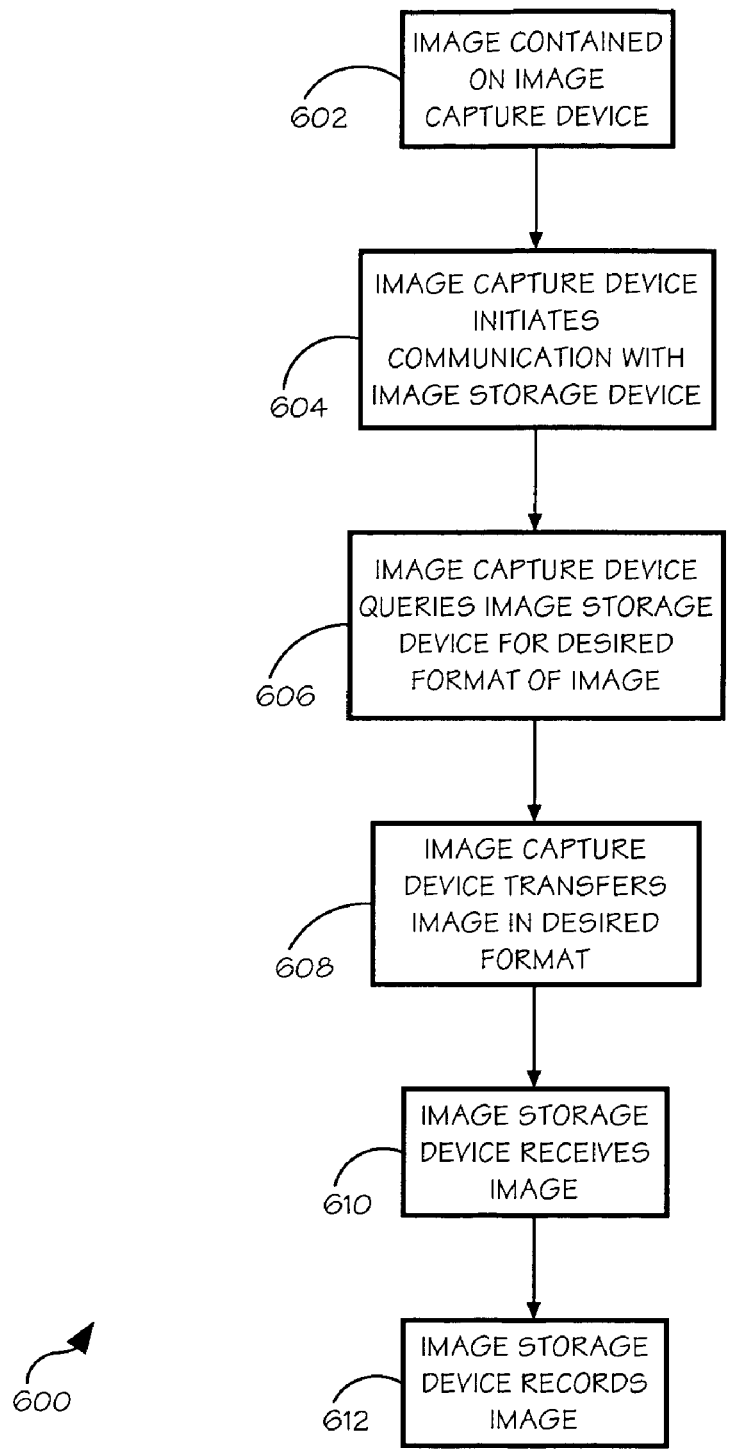
FIG. 6 is a flow diagram depicting an exemplary method of the present invention wherein an image captured on a digital camera determines a desired format of a removable media device, deciphers the image to the desired format, and then transfers and records the image on a removable medium.

Referring now to FIG. 6, an exemplary method 600 is shown wherein an image capture device is capable of encoding the image to a desired format of a storage device. An image is contained on an image capture device 602. The image capture device then initiates communication with an image storage device 604. The image capture device queries the image storage device for the desired format of the image 606. Querying may include receiving data from the image storage device of the formats supported by the image storage device upon initiation of the connection. If the image is not in the desired format, the image capture device may decode/encode the image to the desired format so that the image capture device may transfer the image in the desired format 608. The image storage device may then receive 610 and store the image 612. In this way, an image capture device is capable to transferring images to a wide range of storage devices in a format supported by the storage device, thereby increasing the utility of the image capture device. For example, a user utilizing a digital camera may wish to store an image on a digital versatile disk (DVD). The image capture device, upon initiation of the connection, may determine which format is supported by the digital versatile disk (DVD) and supply the information in that format, such as an MPEG bitstream.

It is believed that the system and method for communicating and recording images of the present invention and many of its attendant advantages will be understood by the forgoing description. It is also believed that it will be apparent that various changes may be made in the form, construction and arrangement of the components thereof without departing from the scope and spirit of the invention or without sacrificing all of its material advantages. The form herein before described being merely an explanatory embodiment thereof. It is the intention of the following claims to encompass and include such changes.

What is claimed is:

1. A method for communicating and formatting an image from an image capture device, comprising:
    initiating a wireless connection between an image capture device and an image storage device;
    querying the image storage device for a supported format; and
    if the supported format differs from an image format, reformatting the image to the supported format without user intervention and communicating the image from the image capture device to the image storage device.

2. The method as described in claim 1, wherein the wireless connection includes at least one of an infrared and radio frequency connection.

3. The method as described in claim 1, wherein the image capture device includes at least one of a digital camera and digital camcorder and the image storage device includes a removable media device including at least one of a digital versatile disk (DVD), digital video disk-erasable (DVD-e), VCD, and compact disc.

4. The method as described in claim 1, wherein deciphering includes decoding the stored image from a first format into a photoframe and encoding the decoded image into a second format.

5. A system for communicating and formatting an image from an image capture device, comprising:
    an image capture device for capturing the image; and
    an image storage device for storing the image to removable media,
    wherein the image capture device initiates a wireless connection between an image capture device and an image storage device; queries the image storage device for a supported format; deciphers the image to the supported format if the supported format differs from the image format, and communicates the image to the image storage device for storage to the removable media.

6. The system as described in claim 5, wherein the wireless connection includes at least one of a infrared and radio frequency connection.

7. The system as described in claim 5, wherein the image capture device includes at least one of a digital camera and digital camcorder and the image storage device includes a removable media device including at least one of a digital versatile disk (DVD), digital video disk-erasable (DVD-e), VCD, and compact disc.

8. The method as described in claim 5, wherein deciphering includes decoding the stored image from a first format into a photoframe and encoding the decoded image into a second format.

* * * * *